United States Patent Office 3,066,030
Patented Nov. 27, 1962

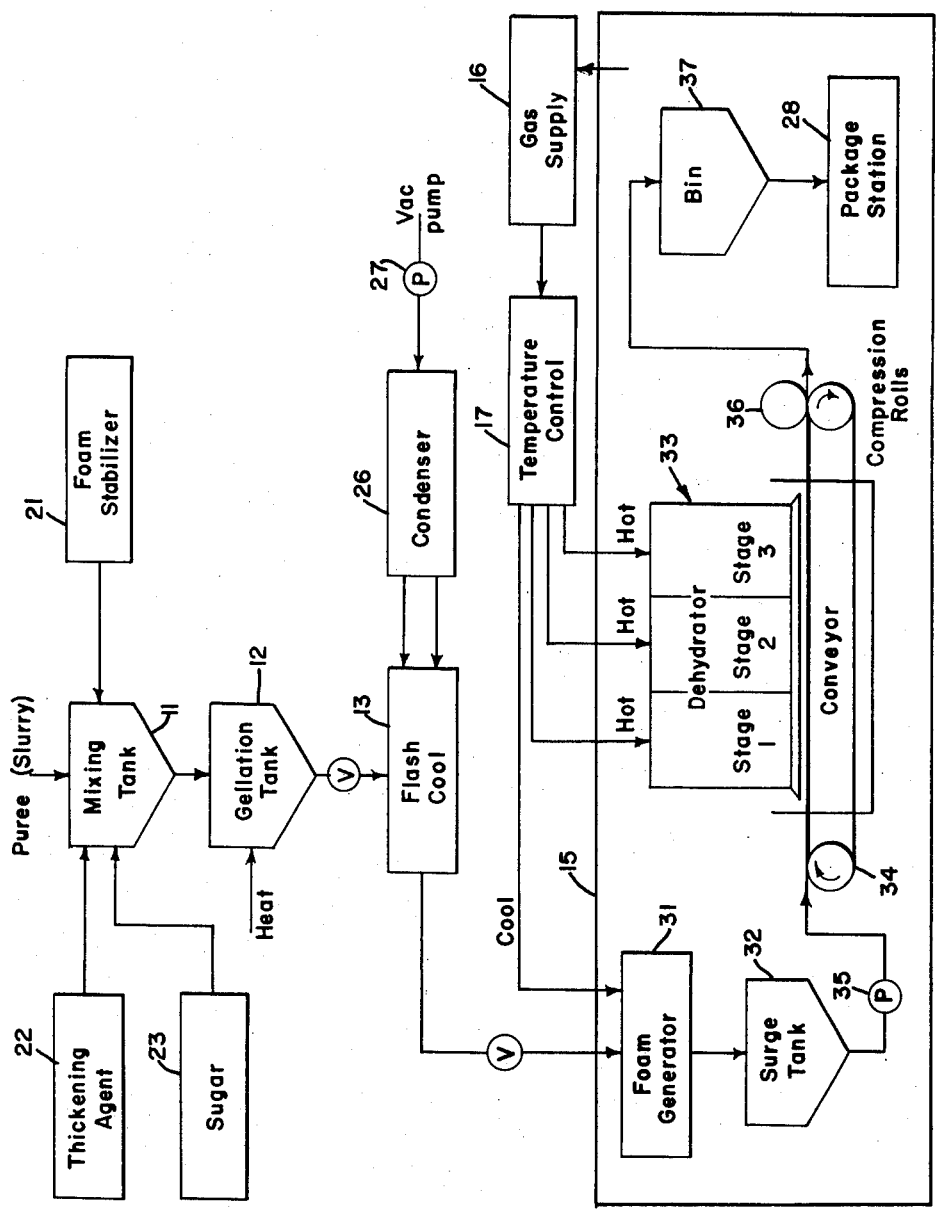

3,066,030
METHOD OF PREPARING DRIED FOODS
Dave Eolkin, Oakland, Calif., assignor to Gerber
Products Company, Fremont, Mich.
Filed June 13, 1960, Ser. No. 35,493
2 Claims. (Cl. 99—204)

This invention relates to a method for processing high sugar content foods such as fruits, vegetables and the like in order to produce a reconstitutable instant food product. More particularly, this method relates to an improved process for dehydrating products containing high percentages of sugar by a modified "foam mat" process.

In order to obtain commercially acceptable instant food products, they must be reconstitutable with the addition of water without impairing flavor, color, nutritive content or consistency, all as compared to the original product. Any method which produces a satisfactory instant dry food product must take into account the initial characteristics of the fruit, vegetable or other product and, additionally, have no tendency to cake or lump when water is added to it.

Various processes for preparing reconstitutable or instant food products have been known for many years. In spite of the fact that instant food products generally present a number of problems to be overcome by a satisfactory process, the additional complexities which become operative when a naturally high sugar content product is dehydrated or sugar is added to a product are substantial.

As pointed out in some detail in my co-pending application Serial No. 35,494, filed June 13, 1960, the dehydration of high sugar content slurries makes handling of film sheets of the material particularly difficult. As a result, the use of drum drying techniques to produce high sugar content dehydrated products has made it necessary to minimize the contact between the fruit puree or slurry and the drum surfaces as well as to carefully control the atmosphere and temperatures in which dehydration steps are accomplished. In spite of the improvement in drum drying techniques, it still remains necessary to carefully control or minimize the amount of sugar added to the food product slurry; otherwise, the plasticity of the film sheets formed makes further handling difficult.

One of the principal advantages of the so-called "foam mat" process of dehydrating food products is that the material need not be mechanically handled once it is placed on a conveyor or other type of support for movement through a dehydrator. Broadly speaking, foam mat dehydration involves the steps of aerating a slurry including a food product to produce a foam consisting of concentrated food product interspersed with air bubbles, and then drying it with hot air. The high proportion of air gives the foam a volume substantially greater than the solid products. After foaming is accomplished, the product is deposited in thin layers on a belt conveyor or tray and put in a dehydrating oven wherein the moisture content is reduced to acceptable levels (approximately 3%). From there the dried porous product may be disintegrated, and stored or packaged.

While the foaming technique may be employed in connection with the dehydration of most food products, it is particularly attractive in the case of high sugar products since it does not necessitate the handling of a sheet of the dehydrated product as in the case of drum process lines. The foam mat process of the prior art, however, is still subject to certain disadvantages with respect to the most efficient processing of high sugar content foods. The difficulties inherent in maintaining the color, flavor, nutritive content and consistency of the rehydrated product remain. For this reason, careful attention has to be given to the environment of the dehydrating oven and the packaging lines.

The principal object of the present invention is to provide an improved process for dehydrating high sugar content foods by a modified foam mat process. Other objects of the invention are to provide a dry, high sugar content food product which is readily reconstitutable by the addition of water without loss of color, flavor, nutritive content or consistency.

One of the difficulties in foam mat techniques attempted to date is that they produce, in common with the drum drying process, a product that does not have the same consistency as the original. In order to overcome this problem, the present invention employs a small percentage of a thickening agent to effect better rehydration. In dehydrating any food product, whether fruit, vegetable, or otherwise, there is a loss of a portion of the gelled characteristic of the plant or animal tissue which is not recovered upon subsequent rehydration. The addition of a thickening agent to the purees or slurry acts to absorb some water during rehydration thereby permitting the reconstituted food to more closely approximate the product from which it was derived.

The thickening agents employed in the preferred embodiment of the present method are selected from the group of hydrophilic or lyophilic food colloids. Examples of these are: soluble starch, agar, gum arabic, gum acacia, carragheen, pectin, dextran, albumin, gelatin, sodium gluten sulphate, dried egg white, etc. Proportions of the colloids selected form 1 to 5% by weight of the slurry or puree, although the actual percentage of the thickening agent depends upon the colloid selected and the percentage of solid food products in the puree.

A typical example of a fruit puree is one including 15–25% total solids to water, which total solids include 1–5% of a suitable thickener, 1 to 2% of a foam stabilizing agent or surface active agent and 50–90% fruit solids. Surface active agents are often employed to improve the foaming characteristics of the product. There are many such agents available. Of course, since the product is to be eaten, it is apparent that the agent selected should be one which is ingestible without adverse effects. Examples of such surface active agents are: fatty acid esters of sorbitan or mannitan, fatty acid esters, agents of the class of sucrose mono- or di-esters with higher fatty acids, agents of the class of glycerol monoesters of higher fatty acid esters, agents of the class of polyoxethylene derivatives of higher fatty acids, and agents of the class of polyoxethylene sorbitan or mannitan fatty acid esters. The percentages, as in the case of the thickening agent, depend upon the particular food product and the agent used.

Other shortcomings of the conventional foam mat processes are found in the limited temperatures which may be employed in the dehydration step and the oxidation of the product with its attendant loss of vitamins and other nutritive content. These are overcome by the present process since the liquid product is foamed by an inert gas such as nitrogen or a process gas, e.g. nitrogen and carbon dioxide, and the inert gas (hot) is used in the dehydrating furnace to dry the "foam mat." The tendency of air or other oxygen containing gases to affect the mat results from the products' sensitivity to oxidation (loss of vitamins, etc.) and scorching (effect on color and flavor)—both being a function of temperature to some extent. An inert gas can "aerate" the liquid and dry the foam mat at higher temperatures without any oxidation and without loss of color or flavor.

The improved process constituting the present invention comprises the steps of mixing a slurry of a food product, a thickening agent and a foam stabilizer, heating the mixture to a temperature in the range of 160–200° F. to activate the thickening agent, cooling the mixture to a temperature in the neighborhood of 80–90° F., aerating the mixture with an inert gas to form a foam, forming thin mats of the foam, dehydrating the foam mats by circulating a hot inert gas thereabout, and processing the dehydrated product for packaging and distribution in a cool inert gas atmosphere.

More boardly, the present method for reconstitutably processing a high sugar content food product comprises the steps of mixing a slurry of product solids and a thickening agent, foaming the slurry mixture with an inert gas, forming mats of the foam on a supporting medium, and dehydrating the foam mat formed by moving it through a dehydrating furnace having an atmosphere of inert gas therein.

These and other objects, advantages and features of the present invention may be more fully understood when the following detailed description is read with reference to the drawing in which apparatus for processing a high sugar content food in accordance with the present invention is schematically illustrated.

The principal apparatus included in the process line for obtaining a reconstitutable high sugar content food product includes a mixing tank 11, a gelation tank 12, a flash cool unit 13, modified foam mat apparatus 15, a source of inert gas 16 and temperature control means 17 therefor.

The fruit, vegetable or other product puree is placed in a mixing tank 11 where the thickening agent, foam stabilizer and/or additional sugar may be added. Therefore, connected to the mixing tank 11 is a source of a foam stabilizing or surface active agent 21, a supply of an appropriate thickening agent 22 and a source of sugar 23. Preselected percentages of the surface active agent, thickening agent and sugar may be added to the slurry in the mixing tank 11 preparatory to placing the mixture in the gelation tank 12.

Heat is applied in the range of 160°–200° F. to the mixture in the gelation tank 12 in order to gel or fully activate the thickening agent in the mixture. From there the mixture is pumped into the flash cool unit 13 which cooperates with a condenser 26 and vacuum pump 27 to reduce the temperature of the puree mixture preparatory to "aerating" the mixture in the modified foam mat apparatus 15.

The foam mat apparatus 15 includes foam generator 31, a surge tank 32, a multi-stage dehydrator 33, a conveyor 34, a storage bin 37 and a package station 38. Briefly, the slurry mixture is pumped into the foam generator 31 which is supplied with relatively cool inert gas from the temperature control means 17. The inert gas is employed to aerate the slurry much as ice creams and other types of materials are foamed. The slurry is subjected to a rotating wire whip or similar device which beats gas into the mixture. Another technique to intersperse the slurry solids in a multitude of gas bubbles is to pump the slurry through a conduit having a restrictive cross section forming a venturi and introducing the gas at this zone of high velocity and low pressure to commingle the gas and the slurry suspension. The particular way in which the gas is intermixed in the slurry to foam the mixture to a volume in the neighborhood of 1½ to 5 times that of the unfoamed product is no part of the present invention; any number of well known methods may be employed, of which the preceding are only exemplary.

The slurry is cooled by the flash cool unit 13 and cool gas employed in order to improve the foaming characteristics of the slurry since heat has a tendency to adversely effect foam formation. This is especially true when air or some other oxygen containing gas is employed to foam the slurry. In any event, the foamed slurry is moved from the foam generator 31 into the surge tank 32 from whence it is carried by pump 35 and deposited on the belt of conveyor 34 as a relatively thin sheet. The moving conveyor 34 carries the foam mat through the dehydrator or furnace 33.

In the exemplary embodiment of the dehydrator 33, three stages are employed in removing the moisture from the thin layers of foamed product. In the first stage, hot inert gas is supplied by way of temperature control means 17 to stage 1 at a temperature in the neighborhood of 300° F. As the foam becomes partially dehydrated, it passes through the second stage of the dehydrator 33 which is supplied with inert gas in the 250° F. temperature range. As the foam continues into the third stage of the dehydrator 33, the temperature of the inert gas is lowered to something on the order of 200° F. After the foam mat has traversed all three stages, the moisture therein has been reduced to something less than 5% and the dehydrated foam mat is passed through a pair of compression rolls 36 and deposited in bin 37 preparatory to flaking, packaging, etc., by package station 38.

The purpose of having a temperature gradient in the dehydrator 33 is to take into account the propensity of the slurry product to scorch or burn as it is dependent on the amount of moisture in the foam mat. When the foam mat first enters the dehydrator 33, it is extremely moist and much higher temperatures may be used. As moisture is removed from the foam mat, it is, to some extent, desirable to reduce the temperature in the furnace.

Although nitrogen or a process gas, e.g. nitrogen and carbon dioxide, are supplied to all three stages of the dehydrator in the exemplary process, superheated steam, which acts as an inert gas, or a combination of air and nitrogen may be employed. For example, air might be used in the first stage where the moisture content is high and the product is not likely to scorch or burn. Nitrogen might be used in the second and third stages where the tendency to scorch and adversely affect color and flavor is more pronounced. The use of air, however, would still have the disadvantage of oxidizing the product to some extent, thereby harming its nutritive content. It is also possible to vary the number of stages or eliminate them altogether.

After the dehydrated foam mat leaves the dehydrator 33, it is important to maintain the inert gas atmosphere throughout the storage and packaging operations. It has been found that maintaining a relatively cool inert atmosphere for the storage, flaking, packaging, etc., steps provides an entirely satisfactory reconstituable high sugar content product which has no tendency to cake or lump upon the addition of water. By relatively cool is meant somewhere in the neighborhood of 40° F., although it is possible to use lower temperatures if desired.

In discussing the dehydrator 33, temperature differentials in the order of 300°, 250° and 200° F. were noted. It should be apparent that other temperatures or gradients may be employed. As a matter of fact, it has been found that temperatures well above 300° may be employed without any adverse effects. This fact places the advantage of the inert gas dehydrating and processing in bold relief when compared to the use of air. In most prior art foam mat processes in which hot air is used to dehydrate the foam mat, the temperatures must not exceed 200° F. or so in order to avoid burning the fruit solids. With the use of an inert gas, the temperatures may be substantially raised and the overall process time substantially reduced.

While the present invention has been described with respect to a particular process line, it should be apparent to those skilled in the art that certain modifications may be effected without departing from the spirit and scope of the invention, which is to be limited only by the appended claims.

What is claimed is:

1. A method for processing a high sugar content food puree to obtain a reconstitutable product comprising the steps of mixing a slurry of a food product, about 1–5% of a thickening agent, and about 1–2% of a foam stabilizer, heating the mixture to a temperature between about 160–200° F. to activate the thickening agent, cooling the mixture to a temperature in the neighborhood of 80–90° F., blending the mixture with a cool inert gas to create a foam, forming thin mats of the foam, dehydrating the foam mats by circulating a hot inert gas thereabout until the moisture in said mats has been reduced to less than 5%, and further processing the dehydrated product in a cool inert gas atmosphere for distribution and consumption.

2. A method for reconstitutably processing a high sugar content food puree comprising mixing a slurry of food product, about 1–5% of a thickening agent, about 1–2% of a foam stabilizer, heating the mixture to activate the thickening agent to a temperature of about 160–200° F., flash cooling the activated mixture to approximately 80° F., aerating the mixture with a cool inert gas to foam the product, forming thin mats of the foam, dehydrating the foam mats by heating them with inert gas atmospheres at successively lower temperatures between approximately 300° F. to approximately 200° F. and until the moisture in said mats has been reduced to less than 5%, disintegrating the dehydrated foam mat, and storing and packaging the foam mat pieces, said disintegrating, storing, and packaging steps being executed in a cool atmosphere of inert gas.

References Cited in the file of this patent
UNITED STATES PATENTS

| | | |
|---|---|---|
| 2,750,998 | Moore | June 19, 1956 |
| 2,955,046 | Morgan | Oct. 4, 1960 |